May 5, 1936.　　　J. L. VAUGHN　　　2,039,756
AUTOMATIC PHONOGRAPH
Filed April 15, 1929　　　12 Sheets-Sheet 1

Fig. 1.

Inventor
John L. Vaughn,
By Cromwell, Grist & Warden
attys

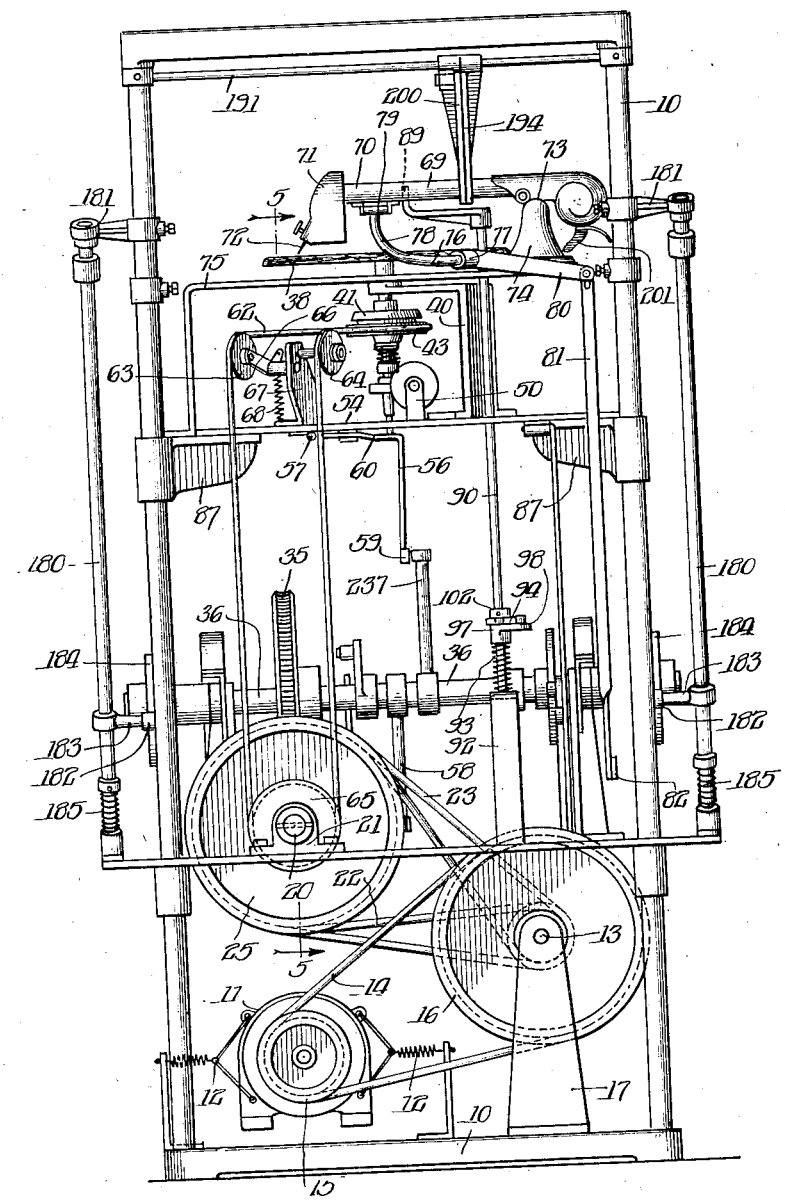

May 5, 1936. J. L. VAUGHN 2,039,756
AUTOMATIC PHONOGRAPH
Filed April 15, 1929 12 Sheets-Sheet 3
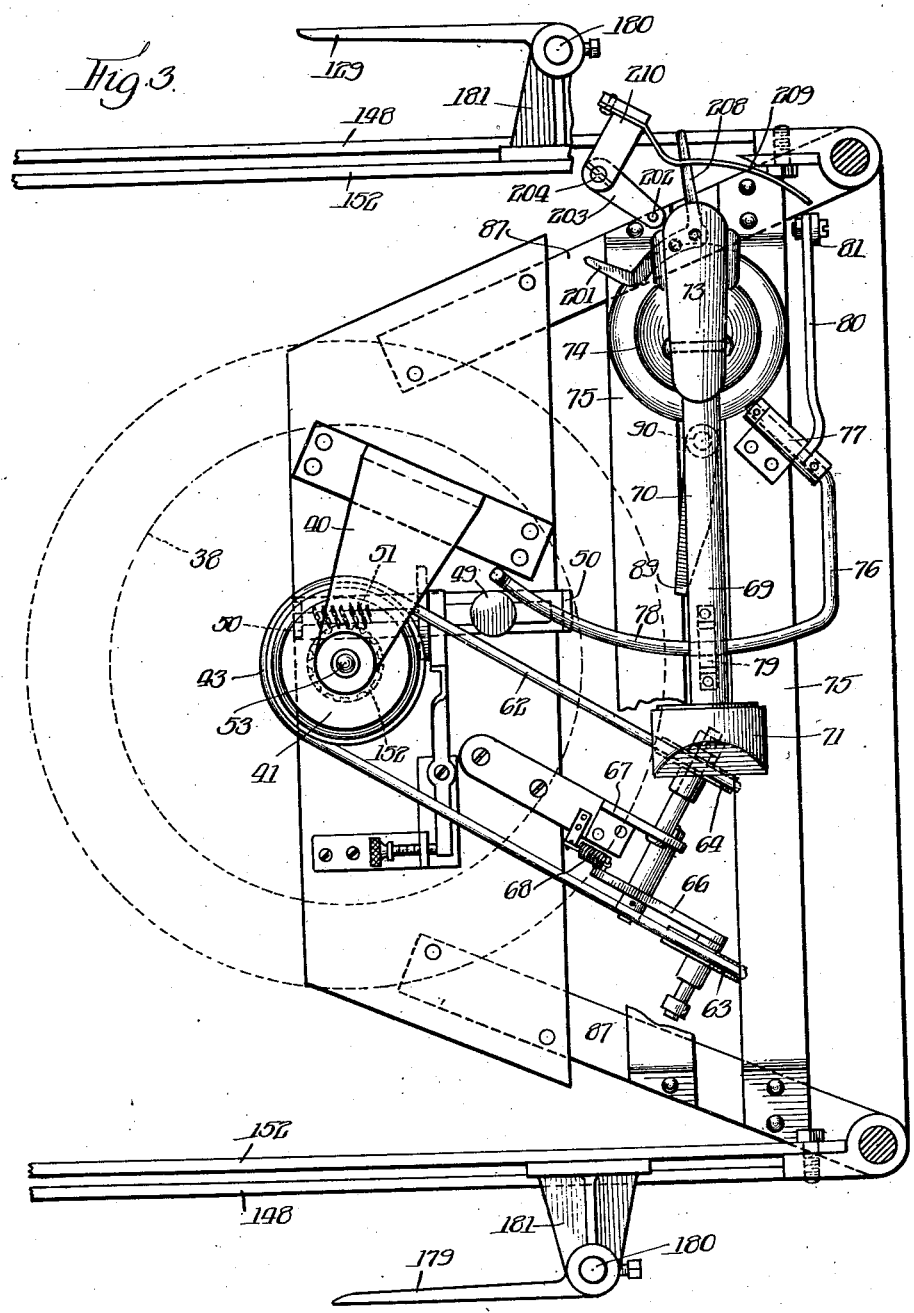
Inventor
John L. Vaughn,
By Cromwell, Greist & Warden Attys.

May 5, 1936. J. L. VAUGHN 2,039,756
AUTOMATIC PHONOGRAPH
Filed April 15, 1929 12 Sheets-Sheet 4
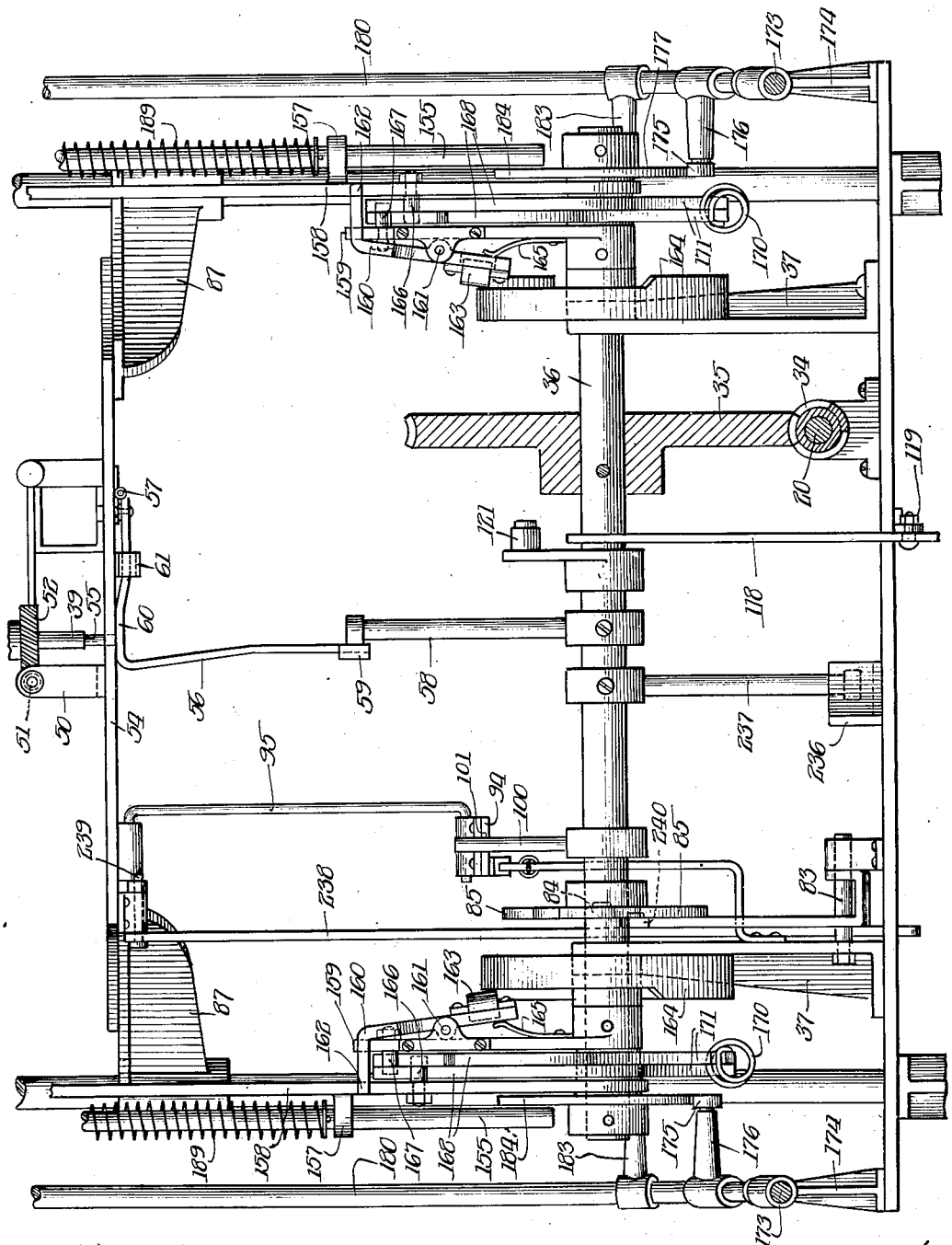
Inventor:
John L. Vaughn,
By Cromwell, Greist & Warden
Attys.

May 5, 1936.  J. L. VAUGHN  2,039,756
AUTOMATIC PHONOGRAPH
Filed April 15, 1929  12 Sheets-Sheet 5
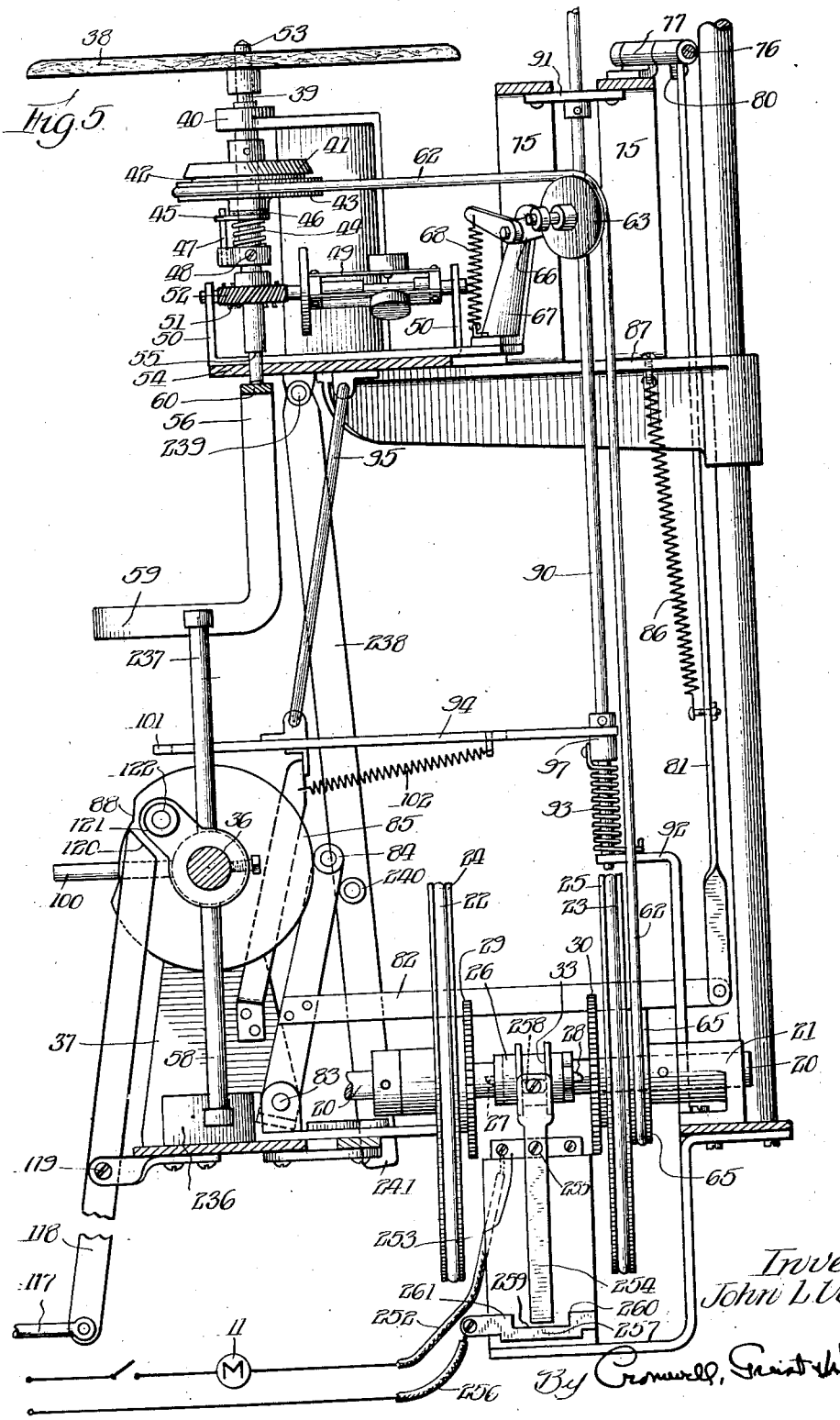

May 5, 1936.  J. L. VAUGHN  2,039,756
AUTOMATIC PHONOGRAPH
Filed April 15, 1929   12 Sheets-Sheet 6
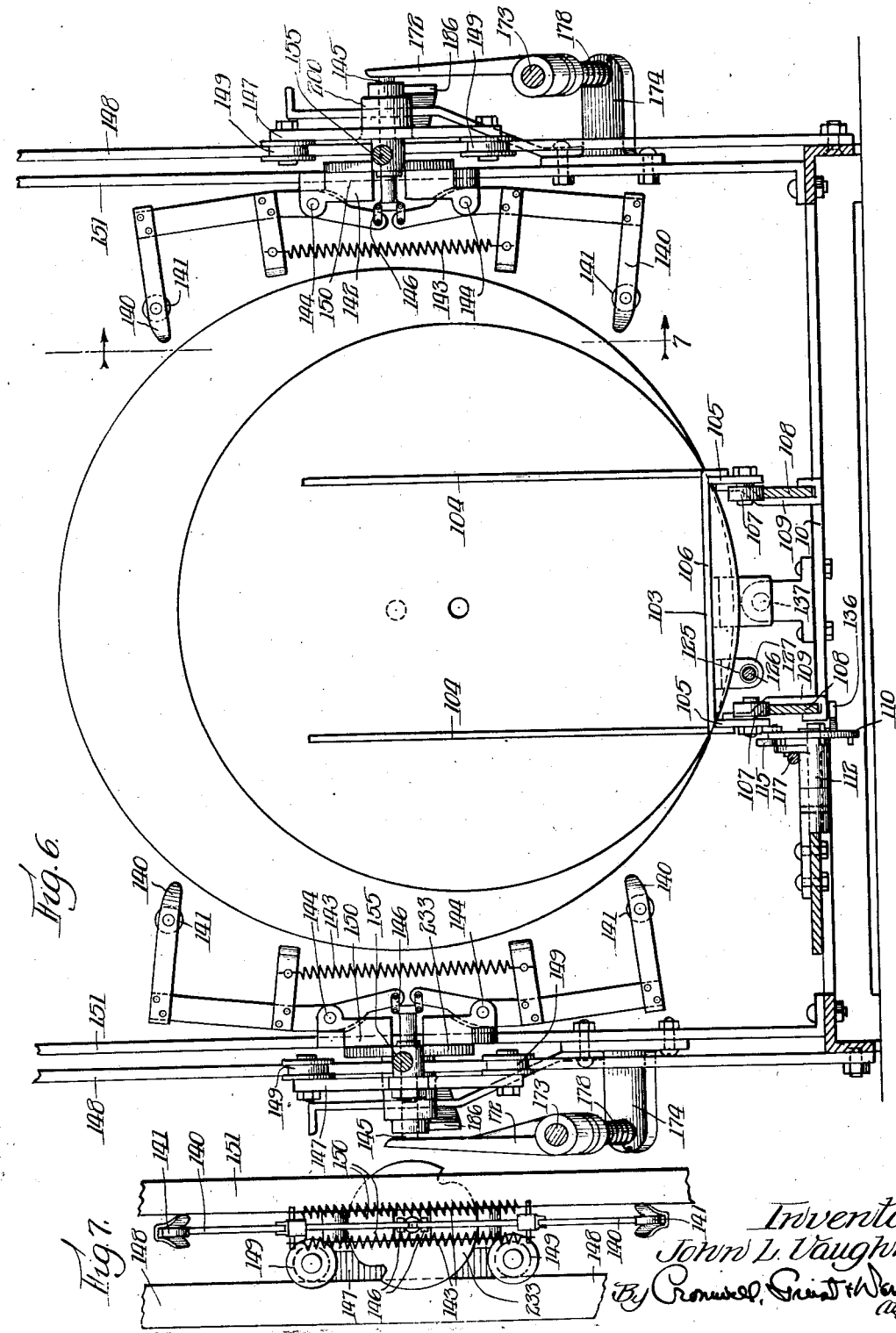

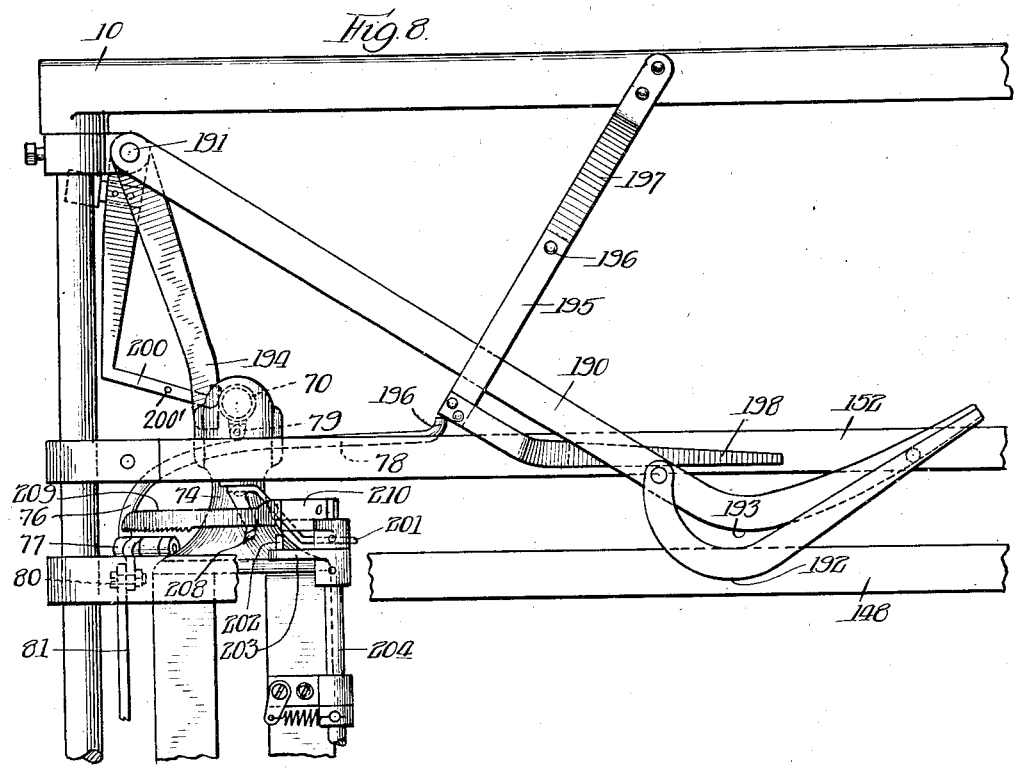
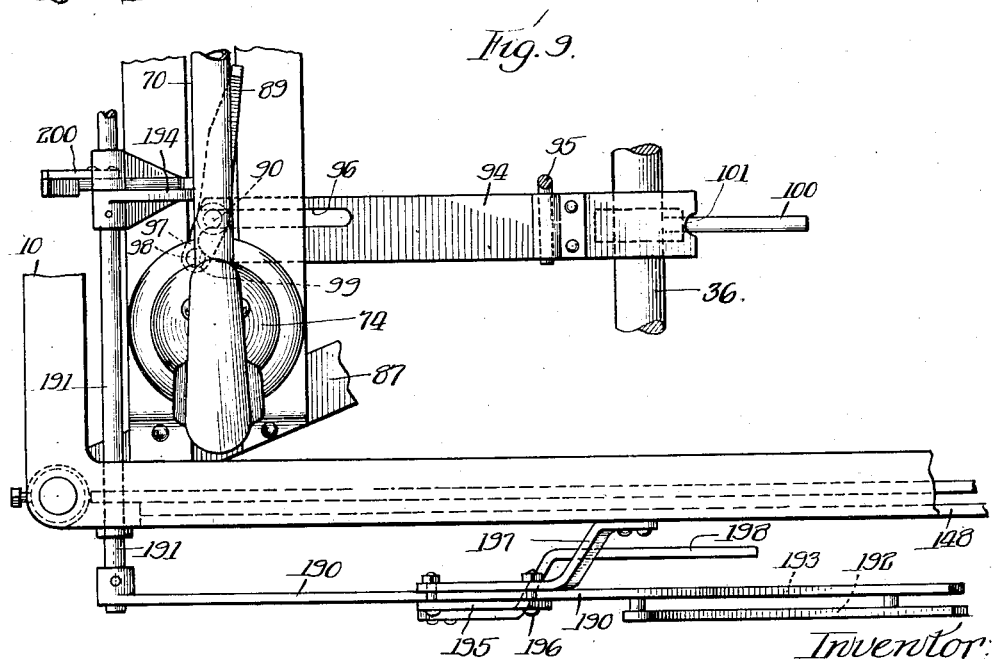

May 5, 1936.　　　　J. L. VAUGHN　　　　2,039,756
AUTOMATIC PHONOGRAPH
Filed April 15, 1929　　　12 Sheets-Sheet 8
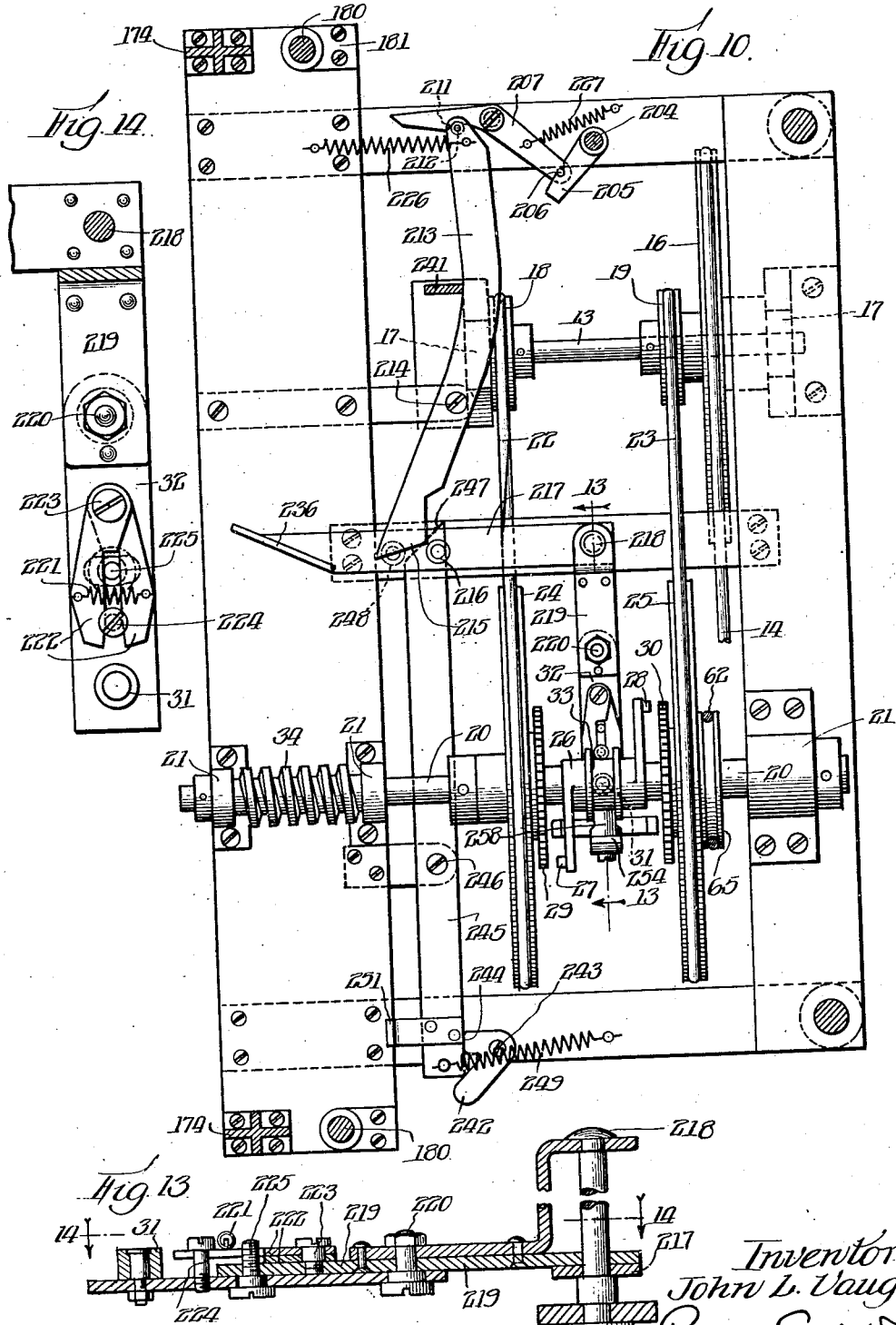

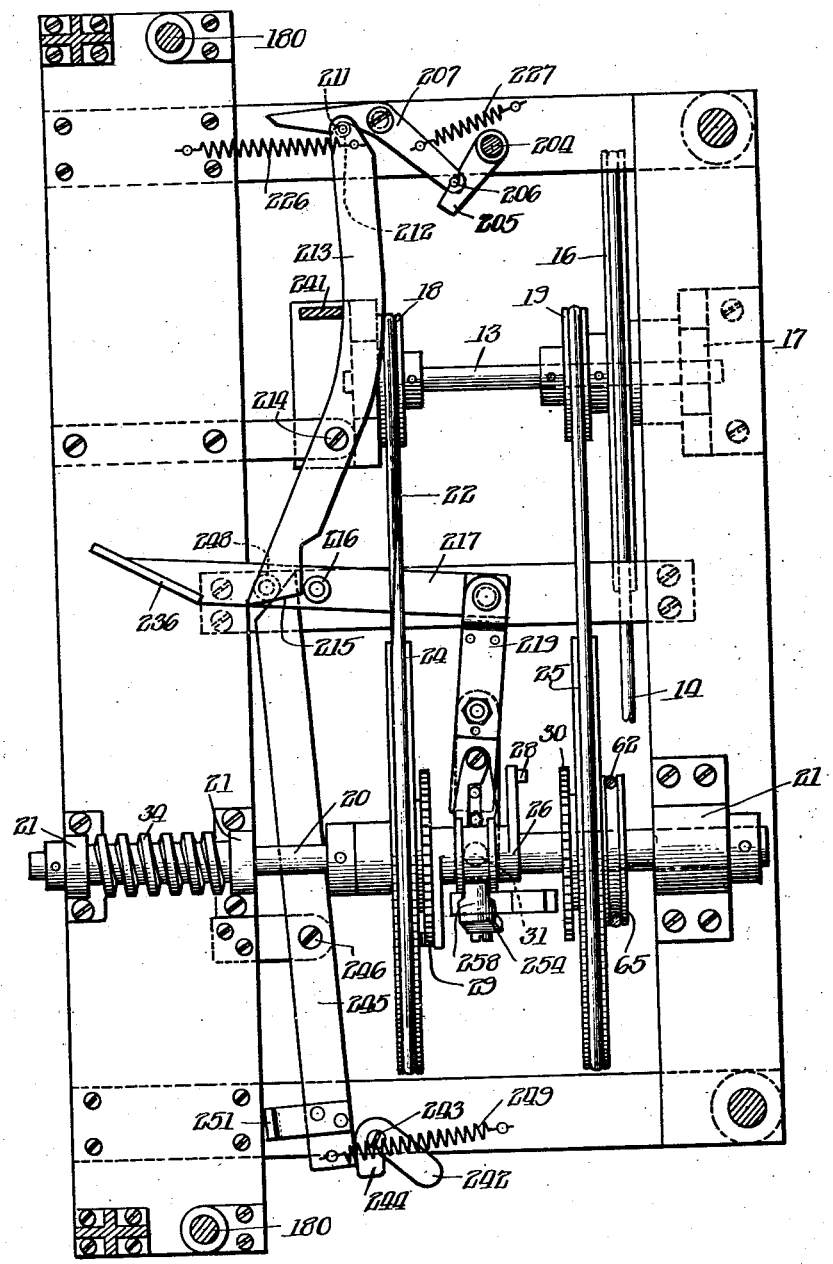

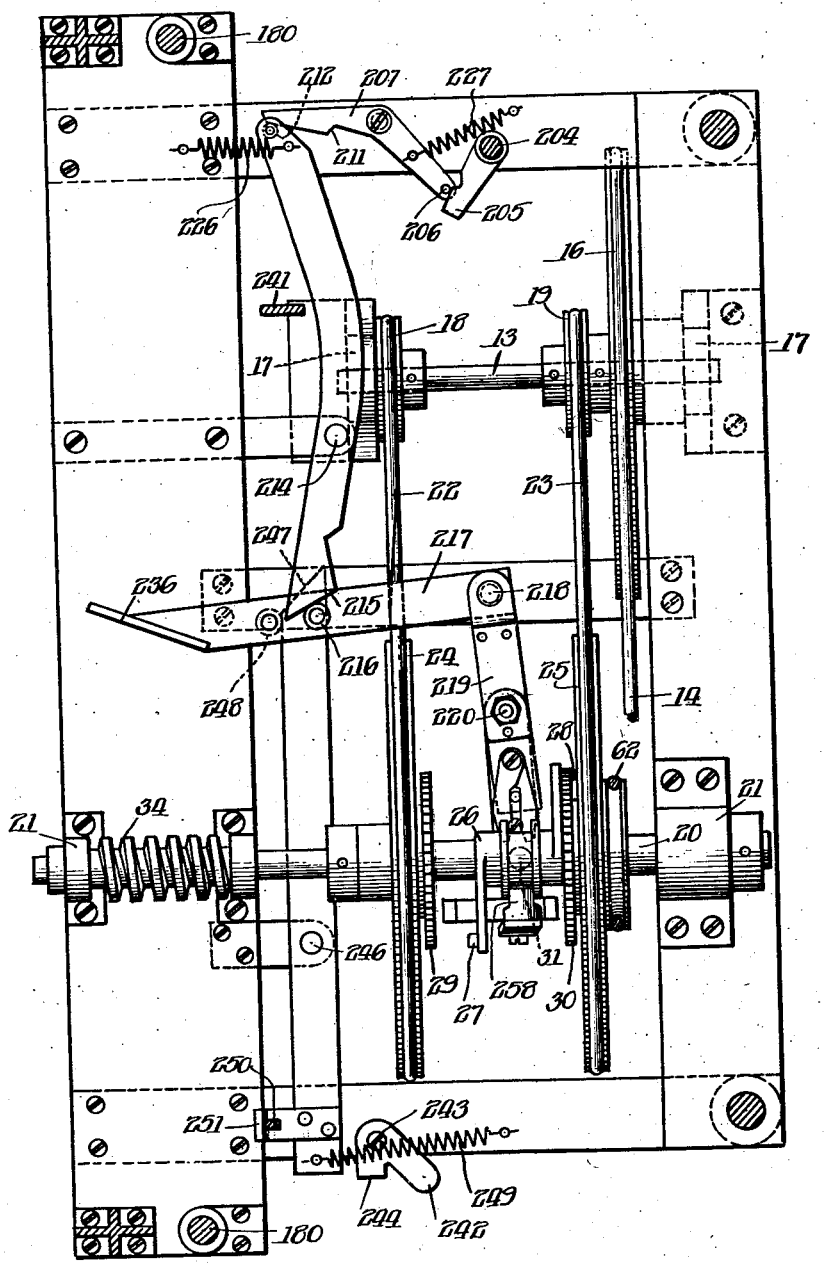

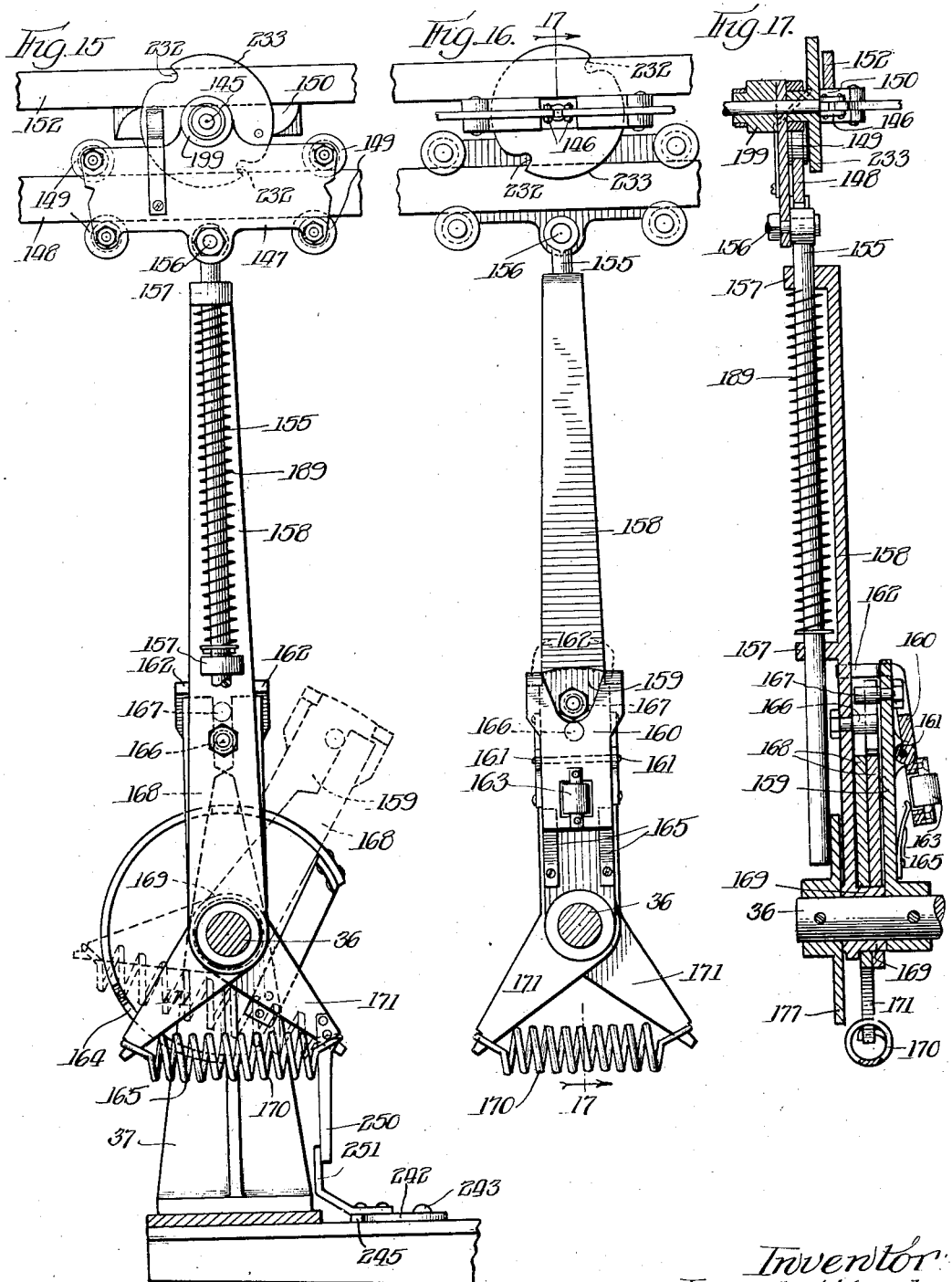

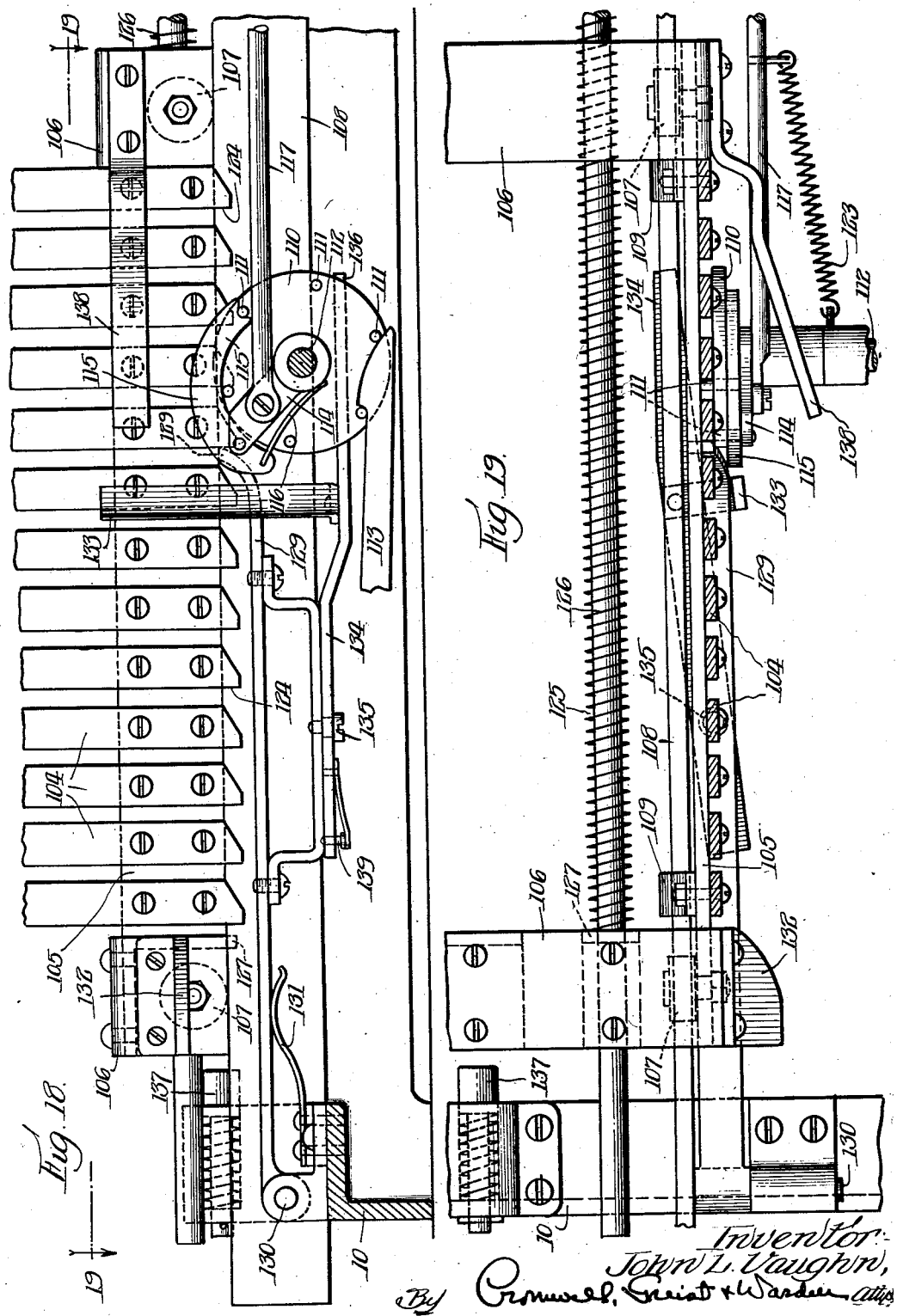

Patented May 5, 1936

2,039,756

UNITED STATES PATENT OFFICE 2,039,756

AUTOMATIC PHONOGRAPH

John L. Vaughn, Cicero, Ill., assignor, by mesne assignments, to The Rudolph Wurlitzer Manufacturing Company, North Tonawanda, N. Y., a corporation of New York Application April 15, 1929, Serial No. 355,163

22 Claims. (Cl. 274—10)

The object of this invention is to provide an automatic phonograph of novel construction, arrangement and operation.

The phonograph of the invention is entirely automatic in its operation. When started, it removes a record from a rack containing a number of records, places the record on a rotating turntable in correct playing position irrespective of the size of the record, swings a tone arm into a position wherein the needle carried by the sound box on the arm is directly over the preliminary grooves in the record irrespective of the size of the latter, lowers the tone arm and needle onto the record, plays one side of the record, lifts the tone arm as soon as the record has been played, removes the record from the turntable, turns the record over, again swings the tone arm into a position wherein the needle is directly over the preliminary grooves in the record, lowers the tone arm, plays the other side of the record, lifts the tone arm as soon as the record has been played, returns the record to the rack, removes the next record from the rack, similarly plays that record, first on one side and then on the other, and continues in the same way to play all of the records in the rack on both sides. After the last record has been played, the phonograph will play all of the records on both sides over again, repeating the series again and again until shut off.

The phonograph is an improvement in many respects over the so-called automatic phonographs of the prior art. It turns each record and plays both sides before taking up another record, thus making possible the playing of an entire opera or symphony recorded in any number of parts, each part in its proper turn, and leaving all of the records in proper position to be repeated when reached again; it plays both 10-inch and 12-inch records positioned at random in the rack; it supports the records in such a way as to prevent warpage; it handles the records perfectly without any possibility of injury; it is absolutely reliable in its operation; it requires very little power, a 1/30 horse power motor being sufficient for the operation of all of the parts; it is absolutely noiseless, all of the parts being belt driven; and the cost of manufacture, compared with that of other automatic phonographs, is very low, no precision work being required, and but a very small percentage of the parts being machined.

While the foregoing statements are indicative in a general way of the nature of the invention, other objects and advantages will be apparent to those skilled in the art upon a full understanding of the construction, arrangement and operation of the phonograph.

One form of the invention is presented herein for the purpose of exemplification, but it will of course be appreciated that the invention is capable of embodiment in other structurally modified forms coming equally within the scope of the appended claims.

In the accompanying drawings:

Fig. 1 is a front view of the phonograph, with the outside ornamental casing removed;

Fig. 2 is a side view of the phonograph, looking toward the right-hand side;

Fig. 3 is a fragmentary plan view, showing only the right-hand side of the phonograph;

Fig. 4 is a vertical section, taken on approximately the line 4—4 of Fig. 1;

Fig. 5 is a vertical section, taken on approximately the line 5—5 of Fig. 2;

Fig. 6 is a vertical section, taken on approximately the line 6—6 of Fig. 1;

Fig. 7 is a vertical section, taken on approximately the line 7—7 of Fig. 6;

Fig. 8 is a fragmentary rear view, showing only the upper right-hand portion of the phonograph;

Fig. 9 is a fragmentary plan view, looking down on the rear right-hand portion shown in Fig. 8;

Fig. 10 is a horizontal section, taken on approximately the line 10—10 of Fig. 1, showing the clutch-controlling mechanism in its neutral or starting position;

Fig. 11 is a corresponding section, showing the clutch-controlling mechanism in its second position;

Fig. 12 is a corresponding section, showing the clutch-controlling mechanism in its third position;

Fig. 13 is a vertical section, taken on approximately the line 13—13 of Fig. 10, showing in detail the clutch-throwing arm, with the clutch collar removed for clearness in illustration;

Fig. 14 is a horizontal section, taken on approximately the line 14—14 of Fig. 13;

Fig. 15 is a fragmentary front view, showing the front record carrier in an elevated position;

Fig. 16 is a fragmentary rear view of the same record carrier;

Fig. 17 is a longitudinal section taken on the line 17—17 of Fig. 16;

Fig. 18 is a fragmentary front view of the lower portion of the record rack; and Fig. 19 is a horizontal section, taken on the line 19—19 of Fig. 18.

As will be observed in the drawings, the various cooperative mechanisms which together constitute the phonograph are mounted in an openwork frame 10 which frame is adapted to fit within a cabinet (not shown) of any suitable description. The motive power used in operating the phonograph is derived from a small electric motor 11 which, to prevent vibration, is suspended on four coil springs 12 in the lower right front corner of the frame. The motor drives a countershaft 13 in the lower right rear corner of the frame through a belt 14 which passes over a small pulley 15 on the armature shaft of the motor and a large pulley 16 on the countershaft. The countershaft 13 is journaled in bearing brackets 17 and carries two small pulleys 18 and 19 (see Fig. 10).

An operating shaft 20 is journaled in bearing brackets 21 above the motor in parallel relation to the countershaft, and is driven by the latter first in one direction and then in the other through two belts 22 and 23. The belt 22 is crossed and passes over both the pulley 18 and a large pulley 24 which is journaled on the operating shaft, while the belt 23 passes over both the pulley 19 and a large pulley 25 which is journaled on the operating shaft in spaced relation to the pulley 24. A clutch collar 26 is splined on the operating shaft between the pulleys 24 and 25, and is provided at its opposite ends with clutch lugs 27 and 28 which are adapted to engage respectively with clutch notches 29 and 30 presented by the adjacent faces of the pulleys 24 and 25.

At certain times in the operation of the phonograph the clutch collar 26 is shifted axially on the operating shaft by means of a roller 31 which is mounted on one end of a clutch-throwing arm 32 and rides within an annular groove 33 in the outer periphery of the collar. When the collar is shifted toward the left side of the phonograph, the lug 27 on the collar engages within one of the notches 29 on the pulley 24 (see Fig. 11), causing the operating shaft 20 to be rotated in a counterclockwise direction as viewed from the right side of the figure, and, when the collar is shifted toward the right side, the lug 28 engages within one of the notches 30 in the pulley 25 (see Fig. 12), causing the operating shaft to be rotated in a clockwise direction. In the central position of the collar (see Fig. 10), the operating shaft 20 is of course at rest.

The operating shaft 20 is provided at one end thereof with a worm 34 which meshes upwardly with a worm gear 35 which is secured to a control shaft 36. The control shaft is positioned at right angles to the operating shaft, and is journaled adjacent its ends in bearing brackets 37 (see Figs. 2 and 4). In the operation of the phonograph, the control shaft rotates intermittently first in one direction and then in the other through an angle of approximately 180 degrees. The various mechanisms with which the control shaft 36 cooperates, as well as the nature of the coaction therebetween, will be subsequently described.

A turntable 38 is mounted in the upper right-hand portion of the frame on the upper end of a vertical spindle 39 which is journaled in a bearing bracket 40. A disk 41, which has a felt washer 42 on the lower face thereof, is secured to the spindle 39 below the bracket 40, and a pulley 43, which is journaled on the spindle below the disk 41, is pressed into frictional engagement with the felt washer 42 by means of a coil spring 44 which urges a small disk 45 upwardly against the hub of the pulley. The disk 45, which has a felt washer 46 on the upper face thereof, is prevented from turning relative to the spindle by means of a vertical pin 47 which is mounted eccentrically in a collar 48 secured to the spindle and passes upwardly through an eccentric aperture in an ear on the disk 45. The spring-pressed disks 41 and 45 provide a yieldable friction drive between the pulley 43 and the spindle 39. The speed at which the turntable is rotated is maintained constant by means of a centrifugal governor 49 of any suitable construction. The governor is journaled in bearing brackets 50, and is provided with a worm 51 which meshes with a worm gear 52 which is secured to the spindle 39 just below the collar 48. The upper end of the spindle 39 projects through the turntable far enough to provide a record-centering stud 53, while the lower end of the spindle projects downwardly through an aperture in a portion 54 of the frame and is limited in its downward movement by a shoulder 55 on the spindle which bears against the portion 54 of the frame when a record is not being played.

Just prior to the playing of a record, the turntable 38 is shifted vertically by means of an L-shaped arm 56 to position the stud 53 within the hole in the center of the record. The arm 56 is pivoted to the portion 54 of the frame at 57 (see Fig. 2), and, when a finger 58 which is secured to the control shaft revolves into engagement with a cam lip 59 on the lower end of the arm 56, the upper horizontally extending portion 60 of the arm is caused to move upwardly into engagement with the lower end of the spindle (see Fig. 4) whereby to elevate the same. Downward movement of the horizontally extending portion 60 of the arm 56 is limited by a stop 61 which is secured to the lower face of the portion 54 of the frame.

The pulley 43, which is journaled on the spindle 39 between the spring-pressed friction disks 41 and 45, is driven by a belt 62 which, after passing about the pulley 43, extends horizontally over two idler pulleys 63 and 64 and then downwardly about a small pulley 65 which is fixedly associated with the pulley 25. The idler pulley 63 is journaled in one end of an arm 66 which is pivotally mounted on a bracket 67 and is connected at the end opposite the pulley with a tensioned coil spring 68 which presses the pulley toward the belt 62 whereby to maintain the latter under tension. The turntable is intended to rotate at approximately 80 R. P. M., and the governor 49 serves to maintain it at that speed even though the pulley 43 is rotated by the belt 62 at a greater speed.

A reproducer 69—which consists of a tone arm 70, a sound box 71 and a needle 72—is positioned in the frame just above the turntable 38. The needle is detachably secured to the sound box, and the sound box is mounted on one end of the tone arm. The tone arm is pivoted at 73 to a communicating tubular support 74 which is mounted on a shelf-like portion 75 of the frame, and the pivotal connection is such as to permit the sound box on the tone arm to be swung both horizontally and vertically to a limited extent. The free end of the tone arm is raised at certain times in the operation of the phonograph by means of an irregularly shaped bellcrank lever 76 (see Fig. 3) which is pivotally mounted in a bracket 77 attached to the portion 75 of the frame. One arm 78 of the bellcrank lever is curved on a radius about the pivotal axis 73 of the tone arm and extends beneath the same. An anti-friction roller 79 is mounted on the bottom of the tone arm directly above the curved arm 78 and supports the weight of the reproducer on the arm 78 when the latter is elevated to lift the needle 72 out of engagement with a record on the turntable. The other arm 80 of the bellcrank lever is connected at its free end with a downwardly extending link 81. The lower end of the link 81 is pivotally connected to one of the ends of a Y-shaped lever 82 (see Fig. 5) which is pivotally connected to the frame at 83, and the other end of the lever 82 carries a roller 84 which rides against the periphery of a cam disk 85 secured to the control shaft 36. The roller 84 is pressed against the periphery of the cam disk by means of a spring 86 which extends between the link 81 and a portion 87 of the frame and tends to hold the link 81 in its upwardly shifted position with the curved arm 78 of the bellcrank lever 76 in its lowered position. When the cam disk 85 revolves into a position wherein the roller 84 rides into a depression 88 in the same, the curved arm 78 is lowered and lowers the sound box onto the record, and, when the cam disk 85 revolves into a position wherein the roller 84 is forced out of the depressed portion 88 (see Fig. 5), the curved arm 78 is raised and raises the sound box off of the record.

The tone arm 70, when lifted by the arm 78, is swung back along such arm in a direction away from the axis of the turntable by means of a finger 89 (see Figs. 2 and 3) which engages at one end with one side of the tone arm and is attached at the other end to a downwardly extending rod 90 which is journaled in suitable bearing apertures in vertically spaced portions 91 and 92 of the frame (see Fig. 5). A coil spring 93 attached to the rod 90 causes the finger 89 to engage with the side of the tone arm and swing the same into its initial position after a record has been played and the tone arm has been lifted. During the playing of a record, the finger 89 is held away from the tone arm through the action of a strip 94 (see Figs. 5 and 9) which is suspended below the portion 54 of the frame in a horizontal position by means of a swinging link 95. The rod 90 passes through a slot 96 in one end of the strip 94 and is provided with an arm 97 on which the slotted end of the strip rests and on which a roller 98 is mounted in engagement with a curved cam surface 99 on the slotted end of the strip. When the tone arm 70 is ready to be moved into its playing position, a finger 100 on the control shaft 36 engages with the opposite notched end 101 of the strip 94 and shifts the latter toward the rod 90, causing the curved surface 99 on the slotted end of the strip to swing the roller 98 and the arm 97 carrying the same through a certain angle, resulting in the finger 89 being swung through a corresponding angle away from the tone arm against the yielding resistance of the spring 93. After the record has been played on one side and the tone arm has been lifted by the arm 78, the finger 100 moves away from the notched end 101 of the strip 94 and permits the spring 93 to turn the rod 90 to allow the finger 89 to swing the tone arm 70 back again to its initial position. As soon as the strip 94 is released it is returned to its original position by a spring 102.

The records played on the turntable 38 by the reproducer 69 are held in a rack 103 before and after being played. The rack is located in the lower left-hand side of the frame and consists of two parallel rows of vertically extending separators 104 (see Figs. 6, 18 and 19). The separators are attached to two parallel sill members 105, and the sill members are connected together by means of two cross members 106. The sill members carry rollers 107 which ride upon two parallel horizontally extending rails 108 mounted in the frame adjacent the bottom of the same. The weight of the rack is supported on the rollers 107, but the rack is prevented from moving laterally or vertically by means of hooks 109 which are attached to the sill members and extends downwardly and outwardly about the lower bottom edges of the rails. The records are inserted between each of the laterally opposed pairs of separators. The separators hold the records in vertical positions, while the sill members engage with the lower edges of the records and center the same with respect to the median plane of the rack irrespective of whether or not the record is of 10-inch or 12-inch size.

After a record has been taken from the rack 103, and played on both sides, and returned to the same compartment in the rack from which it was taken, the rack is moved forwardly along the rails 108 a distance equal to the distance between the centers of adjoining compartments, the movement being accomplished by means of a ratchet arrangement (see Figs. 18 and 19) which includes a circular disk 110 in which six pins 111 are mounted in circumferentially spaced relation. The disk 110 is journaled on a stud 112 which is carried by the frame, and is prevented from turning backward by means of an upwardly spring-pressed escapement hook 113 which engages behind one of the pins 111 each time that the disk 110 is turned one-sixth of a revolution. A ratchet arm 114 is also journaled on the stud 112 alongside the disk 110, and pivotally supports a pawl 115 which is pressed by a spring 116 into engagement with one of the pins 111. A rod 117 is pivotally connected at one of its ends to the ratchet arm 114 and is pivotally connected at its other end to the lower end of an upwardly extending bar 118 (see Fig. 5) which is pivotally connected to a portion of the frame at 119. The upper end of the bar 118 is beveled at 120 and is adapted to engage with a roller 121 which is mounted on the outer end of an arm 122 which is secured to the control shaft 36. Every time that the control shaft 36 revolves in a direction wherein the roller 121 is forced against the upper end of the bar 118—which occurs twice in the period during which a record is played on both sides—the connecting rod 117 is shifted to the right and the disk 110 is caused by the pawl 115 to turn one-sixth of a revolution in the direction indicated by the curved arrow. A spring 123, which extends between a portion of the frame and the rod 117 serves to return the rod and reset the pawl 115 after every movement of the disk 110. Every other time that the disk 110 is rotated one-sixth of a revolution, the rack 103 is advanced the width of one compartment by means of one of the pins 111, which engages with the lower side edge 124 of the particular separator happening to be directly above the disk 110. Only every other one of the pins 111 extends rearwardly through the disk 110 far enough to engage with the lower side edges of the separators, with the result that the rack is advanced only during every other movement of the disk. The advancement of the rack along the rails 108 is yieldingly resisted by a spring 125 which encircles a guide rod 126 and is compressed thereon between a lug 127 on the bottom of the rack and a bracket 128 in which the right hand end of the rod 126 is supported. Every time that the rack is released after having been advanced the width of one of the compartments, the rack is prevented from moving backward by means of a long pawl 129 which is pivotally mounted to the frame at 130 and is pressed upwardly into engagement with the lower side edge of one of the separators by a spring 131.

When the rack 103 reaches its most advanced position, the pawl 129 is released, and the rack is moved all of the way back to its initial position again by the spring 126, but only after the record in the last compartment has been played and returned to such compartment. This is accomplished by the action of a laterally extending cam 132 on the front side of the rack. When the last compartment in the rack moves into alignment with the record-handling mechanism, which mechanism will hereinafter be described, the cam 132 engages with an upwardly extending finger 133 which is rigidly mounted on a bar 134 pivoted at 135 to the bottom of an extension on the pawl 129, and swings the bar 134 horizontally into a position wherein one end 136 of the bar is just below one of the pins 111 which project rearwardly from the disk 110. On the second partial revolution of the disk 110 after this occurrence, the pin 111 above the end 136 of the bar 134 engages with such end, depresses the same and forces the nose of the pawl 129 downwardly out of engagement with the surface 124 of the separator with which it previously was in engagement. The rack, upon thus being released, is returned by the spring 125 into its initial position, wherein the first compartment in the rack is in alignment with the record-handling mechanism. As the rack reaches such initial position, it strikes against a spring-pressed buffer 137 on the frame, and an obliquely extending cam 138 on the front end of the rack engages with the opposite side of the finger 133 and swings the bar 134 about its pivotal axis 135 back into its initial position. In the initial position of the bar 134, an upwardly spring-pressed stud 139 carried by the bar rides into a depression in the downwardly extending portion of the pawl 129, whereby to prevent inadvertent pivotal movement of the bar 134 relative to the pawl 129 until the finger 133 is again engaged and swung laterally by the cam 132.

The records are transferred back and forth between the rack 103 and the turntable 38 by means of four traveling grippers 140 (see Figs. 6 and 7) which are bifurcated at their ends and are provided within such bifurcations with anti-friction rollers 141. The grippers 140 are pivotally mounted in pairs on two carriages 142, and are caused to move into resiliently yieldable engagement with the edges of a record by means of springs 143 which tend to swing the grippers about their pivotal axes 144. The grippers are caused to release a record by the movement of two plungers 145 which are reciprocably mounted in apertures in the centers of the carriages. The inner ends of the plungers 145 are connected with the adjacent ends of the grippers by means of links 146, and, when the grippers move inwardly into engagement with a record under the force imparted thereto by the springs 143, the outer ends of the plungers move outwardly beyond the outer faces of the carriages. When the projecting ends of the plungers are pushed inwardly, the grippers are retracted from the record. The grippers will pick up and hold a 10-inch record or a 12-inch record with equal facility. The grippers, in their retracted positions, are substantially equidistant from the edges of a 12-inch record standing in the rack, but, when they close in on a 10-inch record, the rollers on the lowermost grippers immediately cam the record upwardly into centered relation to all of the grippers.

The carriages 142 are rotatably mounted on trucks 147, and the axes of rotation of the carriages are concentric with the axes of the plungers 145. The trucks 147 travel on two spaced L-shaped tracks 148 (see Fig. 1) which, commencing at points adjacent the front of the rack 103, extend first upwardly and then horizontally, terminating a short distance beyond the location of the turntable 38. The trucks are provided with anti-friction rollers 149 which engage with the opposite edges of the tracks. During the vertical movement of the trucks, the carriages are prevented from turning out of vertical positions by block formations 150 on the carriages (see Figs. 15 and 17) which slide along vertical guides 151, and, during the horizontal movement of the trucks, the carriages are prevented from turning out of a horizontal position by sliding engagement of the block formations 150 with horizontal guides 152. The extent to which the trucks 147 can move downwardly into operative relation to the rack 103 is determined by the location of stops 153 which are adjustably attached to the lower ends of the tracks 148 and abut with the edges of the trucks, while the extent to which the trucks can move horizontally into operative relation to the turntable 38 is determined by the location of similar stops 154 which are adjustably attached to the other ends of the tracks 148.

The trucks 147, together with the carriages 142 and the grippers 140 associated therewith, are moved back and forth between the rack 103 and the turntable 38 by means of rods 155 (see Figs. 1 and 15) which are pivotally attached to the trucks at 156 and are slidably mounted in spaced ears 157 formed on two arms 158. The arms 158 are pivotally mounted on the control shaft 36 alongside two relatively short arms 159 which are rigidly attached to the control shaft. The arms 159 are coupled to the arms 158 at certain times in the operation of the phonograph by brackets 160. The arms 158, in moving the trucks 147 from positions opposite the rack to positions opposite the turntable, move through an angle of approximately 120 degrees while, as previously stated, the control shaft moves through an angle of approximately 180 degrees. The arms 159, during approximately the first and last 25 degrees of their movement, are uncoupled from the arms 158 by a rocking movement of the brackets 160. The brackets 160 are pivoted to the arms 159 at 161 (see Figs. 4, 15, 16 and 17) and are provided at their outer ends with pairs of spaced lugs 162 which embrace the arms 158 when the arms 158 and 159 are to move in unison. During approximately both the first and last 25 degrees of movement of the arms 159, cam rollers 163 on the inner ends of the brackets 160 ride up onto stationary cams 164 carried by the brackets 37 in which the control shaft 36 is journaled, and cause the brackets 160 to rock about their pivotal axes against the yielding resistance of springs 165, whereby to cause the lugs 162 on the brackets 160 to disengage from the arms 158. After the arms 159 have been uncoupled from the arms 158, the arms 158 cease to move, while the arms 159 continue to move with the control shaft. The arms 158 carry studs 166 which project toward the arms 159, while the arms 159 carry similar studs 167 which project toward the arms 158. The studs 166 and 167 are engaged by blades 168 which are pivotally mounted in pairs on the hub portions 169 of the arms 158 and are pressed toward each other against the studs by coil springs 170 which are connected to projections 171 on the blades. The blades 168 tend to maintain the arms 158 in radial alignment with the arms 159. During the separate movements of the arms 159, the springs 170 yield (see dotted line position in Fig. 15) and the tension of the same serves to prevent inadvertent backward movement of the arms 158 while uncoupled from the arms 159.

When the trucks 147 reach their lowermost positions at opposite sides of the rack 103 and are brought to rest by the stops 153, the plungers 145 are pressed inwardly by fingers 172, whereby to cause the grippers 140 to retract from the record with which they were last in engagement. The fingers 172 (see Figs. 1 and 6) are attached to rods 173 which are journaled in bearing brackets 174 attached to the frame, and the rods 173 are oscillated to move the fingers 172 at the proper times by means of cam rollers 175 which are carried by arms 176 attached to the rods 173. The cam rollers 175 ride upon cams 177 which are attached to the ends of the control shaft 36. When the rollers 175 are engaged by the cams 177— which engagement occurs only after the trucks 147 have come to rest opposite the rack—the fingers 172 are swung toward the trucks 147 and depress the plungers 145. At other times, the fingers 172 are swung outwardly into inoperative positions by means of coil springs 178 which are mounted on the rods 173. When the trucks reach their uppermost positions at opposite sides of the turntable 38 and are brought to rest by the stops 154, the plungers 145 are again pressed inwardly to release the grippers 140 from the record, this time by fingers 179 which are attached to rods 180 journaled in bearing brackets 181. The fingers 179 are caused to swing inwardly against the ends of the plungers 145 by cam rollers 182 which are mounted on the ends of arms 183 attached to the rods 180. When the trucks arrive opposite the turntable, the rollers 182 ride up on cams 184 which are formed integrally with the cams 177, and the rods 180 are oscillated, causing the fingers 179 to swing inwardly and depress the plungers. At other times, the fingers 179 are swung outwardly into inoperative positions by means of coil springs 185 which are mounted on the rods 180.

When the trucks 147 move downwardly into their lowermost positions into proper register with one of the compartments in the rack, they engage with bars 186 which are pivoted to the frame at 187 (see Fig. 1) and force the free ends of such bars downwardly against the yielding resistance of springs 188 attached to the bars, with the result that, when the trucks start their upward movement, the springs 188 act as boosters for the same, thereby necessitating but little power to initiate upward movement. The upward movement of the bars 186 is arrested by suitably arranged stop brackets. During the movement of the trucks 147 along the tracks 148, the rods 155 must shift longitudinally within the ears 157 on the arms 158 in order to compensate for the differences in the distance between the control shaft 36 and the tracks 148 at various points throughout the lengths of the latter. Springs 189 are mounted on the rods 155 and act between the same and the arms 158 in such a way as to hold the trucks snugly against the inner edges of the tracks at all times.

As the trucks 147 approach the location of the turntable 38 with a record supported in the grippers 140, the projecting end of the plunger 145 associated with the rear truck rides under a lever 190 (see Figs. 8 and 9) which is attached to a rock shaft 191 mounted in the upper right-hand rear corner of the frame adjacent the tone arm 70. If the grippers are carrying a 10-inch record, the plunger 145 will project out far enough to engage with a curved surface 192 on a laterally and downwardly offset portion of the arm 190, thereby raising the arm 190 through a considerable angle, but if the grippers are carrying a 12-inch record, the end of the plunger 145 will not project out far enough to engage with the lower surface 192 but will engage instead with a curved surface 193 on the arm a short distance above and inwardly of the surface 192, thereby raising the arm 190 through a smaller angle. The shaft 191 to which the arm 190 is attached carries a depending finger 194 which is adapted to move into engagement with one side of the tone arm 70. When the arm 190 is raised by the plunger 145, the finger 194 swings the tone arm 70 over toward the record which is being deposited on the turntable by the grippers. If the record is of 10-inch size, the arm 190 will swing the finger 194 quite a distance in order to push the tone arm into a position directly above the beginning of the sound groove in the record, but if the record is of 12-inch size, the finger 194 will push the tone arm over only far enough to bring it directly above the beginning of the sound groove in the larger record. The plunger 145 which cooperates with and raises the arm 190 is carried a little beyond the curved surfaces 192 and 193 on the arm as the grippers move into proper position to deposit a record on the turntable, but the arm 190 is prevented from dropping down again by means of a clamping strip 195 which is loosely attached at 196 to a stationary bar 197. The arm 190 extends between the strip 195 and the bar 197 and is clamped frictionally therebetween whenever the strip 195 is rocked with respect to the bar 197. After the plunger 145 raises the arm 190 to the correct elevation for the particular size of record being carried, the arm 190 is held up in that position by means of an angularly disposed finger 198 which is rigidly secured to the strip 195 and is cammed upwardly and laterally by a portion 199 of the truck 147. A counterweighted arm 200 is journaled on the rock shaft 191 alongside the finger 194 and in its normal position projects laterally toward the tone arm just a little bit farther than the finger 194, with the result that, after the tone arm is lowered to bring the needle into the preliminary grooves in the record, the slight pressure exerted against the side of the tone arm by the arm 200 is sufficient to slide the needle into the first groove in case it is lowered on the smooth edge of the record. Movement of the arm 200 toward the right, viewing Fig. 8, is limited by engagement of the pin or stop 200' with the finger 194. After the record is played, the withdrawal of plunger 145 from beneath arm 190 permits counterclockwise movement of finger 194 to inoperative position, thereby returning, by means of the pin 200', the arm 200 to initial position. The tone arm is returned to initial position by the finger 89 as previously explained.

When the needle 72, in playing a record on the turntable, reaches the end of the sound groove, it enters, on one type of record, an inwardly spiraling portion of the groove, causing the tone arm 70 to swing abruptly inward. The tone arm is provided, on the end thereof opposite the sound box 71, with a finger 201 (see Fig. 3) which engages with a pin 202 carried by a lever 203 attached to a downwardly extending rod 204. A notched lever 205 (see Fig. 10) is attached to the lower end of the rod 204, and, when such rod is oscillated at the completion of the playing of one side of a record, the lever 205 is swung out of hooked engagement with a pin 206 on the end of a pivoted lever 207, resulting in the shifting of the clutch collar 26 in a manner hereinafter described. If the record, however, is of the type wherein the sound groove leads into an endless eccentric groove, a thin upwardly spring-pressed blade 208 which is carried by the end of the tone arm 70 adjacent the finger 201 engages with a saw-toothed edge on the bottom of a curved blade 209 which is carried by an arm 210 fastened to the rod 204, with the result that the slight oscillating movement of the tone arm caused by the eccentricity of the center groove in the record causes the blade 208 to catch against the blade 209 and move the rod 204 in the same direction that it would otherwise be moved by the finger 201 upon engagement with the pin 202. When the rod 204 is turned, by either the action of the finger 201 or the blade 208, the lever 205 releases the lever 207, causing the operating shaft 20 to be clutched to the pulley 25 whereby to rotate the control shaft 36 in a direction wherein the grippers 140 will move from the turntable to the rack.

The lever 207 (see Fig. 10) has a recessed portion 211 which engages with a pin 212 on one end of a lever 213 which is pivoted to the frame at 214. The lever 213 is provided at the other end with a beveled nose 215 which is adapted to cam against a roller 216 mounted on an L-shaped lever 217. The lever 217 is pivoted to the frame at 218 and carries the previously described clutch-throwing arm 32. The arm 32, which forms an extension of one portion 219 of the lever 217, is pivotally attached to the same at 220, and is laterally deflectible against the yielding resistance of a spring 221 for the purpose of giving the clutch lugs 27 and 28 time in which to work into the notches 29 and 30 when the lever 217 is oscillated to shift the clutch collar 26, whereby to prevent clashing of the clutch elements. The spring 221 is fastened across two jaws 222 which are pivoted to the portion 219 at 223. The jaws 222 are pressed together by the spring 221 against two studs 224 and 225 which are carried respectively by the arm 32 and the portion 219 of the lever 217. When the recessed portion 211 of the lever 207 is disengaged from the pin 212 on the lever 213, a spring 226 connected with that end of the lever 213 oscillates the latter against the yielding resistance of a weaker spring 227 connected to the lever 207 and causes the beveled nose 215 of the lever 213 to engage with the roller 216 on the lever 217 and oscillate the latter to shift the collar 26 into clutched driving engagement with the pulley 25, thereby causing the control shaft 36 to rotate in a direction wherein the trucks 147 will be caused to move from the location of the turntable back to the location of the rack.

When the trucks 147 reach the curved portions 228 of the tracks 148 in returning to the rack, two pawls 229, which are pivoted to the frame at 230 and are drawn resiliently downward by springs 231, engage within notches 232 in the circular peripheries of disks 233 which are fixedly associated with the carriages 142 in concentric relation to the plungers 145, causing the disks and carriages to rotate 180 degrees as the trucks move past the locations of the pawls. As soon as the carriages have been rotated 180 degrees, the guide blocks 150—which have moved out of engagement with the horizontal guides 152—move into engagement with angularly disposed portions 234 of the vertical guides 151, which portions, together with supplemental guide portions 235, maintain the guide blocks 150 in proper position until they move into engagement with the vertical guides 151. From this description, it will be understood that every time that the trucks 147 pass the location of the pawls 229 in returning to the rack, the carriages 142 will be rotated 180 degrees, causing the grippers to reverse the position of the record carried by the same. When the trucks pass the location of the pawls 229 in moving upwardly from the rack to the turntable, however, the carriages are not rotated by the pawls 229, the latter being merely cammed upwardly by the peripheries of the disks 233.

As soon as the reproducer 69 finishes playing a record on one side, the lever 217 is oscillated by the lever 213 and the clutch collar 26 is as a result shifted from the position shown in Fig. 10 into that shown in Fig. 12, whereby to cause the operating shaft 20 to be connected with and rotated by the pulley 25. The control shaft 36 is in consequence rotated in a counterclockwise direction as viewed in Fig. 1, which rotation continues until the finger 58, which was previously described in its association with the turntable-raising lever 56, moves into engagement with an obliquely disposed lip 236 on the free end of the lever 217 and cams the lever from the position shown in Fig. 12 into that shown in Fig. 11, causing the collar 26 to be shifted into clutched engagement with the pulley 24 and the control shaft to be rotated in a clockwise direction. When the control shaft 36 has rotated far enough in that direction to bring the grippers of the record-handling mechanism opposite the turntable, elevate the turntable, elevate the turntable and release the grippers from the record, a finger 237 on the control shaft 36 moves into engagement with the back of the lip 236 on the lever 217 and cams such lever in the reverse direction far enough to unclutch the collar 26 from the driving pulley 24. After the lever 213 has moved into the position shown in Fig. 12 to actuate the lever 217, it is returned to the position shown in Fig. 10 against the action of the spring 226 by means of a lever 238 (see Fig. 5) which is pivoted at 239 to the frame and is provided with a roller 240 against which the lever 82 is adapted to bear. When the lever 82 is swung away from the control shaft 36 by the cam 65, it swings the lever 238 in the same direction, and the lower end 241 of the lever 238 (see Fig. 10) engages with one side of the lever 213 and pushes the latter back into hooked engagement with the lever 207.

The phonograph is placed in operation by moving a finger piece 242 from the off position shown in Fig. 10 to the operating position shown in Figs. 11 and 12. The finger piece is pivoted to the front of the frame at 243 and is provided with an eccentric portion 244 which, when the finger piece is in its off position, holds a bar 245 in the position shown in Fig. 10. The bar 245 is pivoted at 246 to the frame, and is provided with a beveled end 247 which extends beneath the lever 217 and is adapted to engage with a roller 248 mounted on the bottom of the lever 217. When the finger piece is moved from the position shown in Fig. 10 to the position shown in Fig. 11, a spring 249 which is attached to the end of the bar 245 adjacent the finger piece oscillates the bar 245, and the beveled end 247 of such bar engages with the roller 248 and oscillates the lever 217 from the position shown in Fig. 10 to that shown in Fig. 11. As soon as the lever 217 has been oscillated by the bar 245 into the position shown in Fig. 11, the operating shaft 20 is connected with and driven by the pulley 24, and the control shaft 36 rotates in a clockwise direction as viewed in Fig. 1, from the position shown in that figure into a position wherein the control shaft and the parts attached thereto have rotated approximately 180 degrees. In order to prevent the spring 249 from causing the bar 245 to swing the lever 217 from the position shown in Fig. 10 to that shown in Fig. 11 while a record is being played, a finger 250 (see Fig. 15) is mounted on the lower end of one of the jaw extensions 171 in such a position as to abut against a small bracket 251 on the lever 245 and hold such lever against movement as long as the record-handling mechanism remains at the location of the turntable.

The circuit of the motor 11 is shown schematically in Fig. 5. One lead 252 from the motor connects with a bar 253 to which a switch blade 254 is pivotally connected at 255, while another lead 256 of opposite potentiality connects with a plate 257 against which the lower end of the blade 254 is adapted to slide. The upper end of the blade 254 carries a follower 258 which rides in the groove 33 in the clutch collar 26. When the phonograph is shut off, the collar 26 is in the position shown in Fig. 10, and the lower end of the blade 254 is opposite a notch 259 in the plate 257, with the circuit of the motor open. When the finger piece 242 is moved to start the operation of the phonograph, the collar 26 is shifted to the position shown in Fig. 11, and the lower end of the switch blade 254 is swung into contact with the portion 260 of the plate 257, energizing the motor. When the record-handling mechanism reaches a position opposite the turntable 38, the collar 26 is shifted into neutral but not far enough to disengage the lower end of the blade 254 from the portion 260 of the plate, with the result that, although the control shaft 36 comes to rest, the motor continues to rotate the turntable. As soon as the record on the turntable has been played through, the collar 26 is shifted from neutral into the position shown in Fig. 12 and the lower end of the switch blade 254 is swung quickly past the notch 259 into contact with the opposite portion 261 of the plate.

The operation of the phonograph is as follows:

Commencing with the various parts in the positions shown in Figs. 1, 2, 3, 5, 6, 7, 8, 9, 10, 13, 14, 18 and 19, and with the rack 103 filled with 10-inch and 12-inch records arranged at random, it is merely necessary for the operator to swing the finger piece 242 from the position shown in Fig. 10 to that shown in Fig. 11, whereupon the phonograph will automatically play each of the records in the rack, first on one side and then on the other, in the order in which they are arranged in the rack, without further attention on the part of the operator, and will repeat such performance over and over again until the operator shuts off the phonograph by swinging the finger piece 242 back into the position shown in Fig. 10.

As soon as the finger piece 242 is swung by the operator into the starting position, the lever 217 is caused to swing into the position shown in Fig. 11, energizing the motor 10 and shifting the clutch collar 26 to cause the control shaft 36 to rotate in the direction indicated by the curved arrow in Fig. 1.

During approximately the first 25 degrees of rotation of the control shaft, the trucks 147 of the record-handling mechanism remain stationary, and the cams 177 cause the fingers 172 to swing away from the ends of the plungers 145, allowing the grippers 140 to close in on and engage with a record standing in the particular compartment of the rack which happens to be opposite the grippers.

As soon as the control shaft 36 has completed approximately the first 25 degrees of rotation, the lower cams 164 allow the arms 159 on the control shaft to pick up the arms 158, and the trucks 147, together with the carriages 142 and the grippers 140 holding a record, are moved first upwardly and then horizontally along the tracks 148 into positions wherein the record held by the grippers is centered directly over the turntable 38. Just before the grippers 140 reach that position with the record, the plunger 145 carried by the rear truck moves under the arm 190 into camming engagement with either the surface 192 or the surface 193, depending on whether the record being carried is of 10-inch size or 12-inch size, and, as the arm 190 is in consequence forced upwardly, the tone arm 70 is swung inwardly by the finger 194 along the supporting arm 78 into a position wherein the needle 72 is directly over the preliminary sound grooves in the record. As soon as the record has been centered on the turntable and the tone arm has been swung into proper position, the upper cams 164 cause the arms 159 to disengage from the arms 158, and the control shaft 36 continues to rotate approximately 25 degrees more. At about the same time, the finger 58 on the control shaft causes the lever 56 to elevate the turntable 38 into a position wherein the stud 53 is projected into the hole in the center of the record, the finger 100 on the control shaft causes the strip 94 to swing the finger 89 laterally out of the path subsequently followed by the tone arm in playing the record, and the cam 85 on the control shaft causes the lever 82 to lower the arm 78, whereby to lower the tone arm and bring the needle 72 down onto the record.

Upon the completion of the above described operations, the record commences to play, and the finger 237 on the control shaft causes the lever 217 to shift the collar 26 from the position shown in Fig. 11 to a neutral position wherein it is about halfway between that position and the position shown in Fig. 10, in which position the control shaft comes to rest.

When the record has been played on one side, the needle 72 rides into the inwardly spiraled or eccentric end of the sound groove in the record and either the finger 201 on the tone arm, or the blade 208, depending upon whether the inner end of the sound groove in the record is of spiral or eccentric formation, causes the rod 204 to release the lever 207, thereby allowing the spring 226 to shift the collar 26 from neutral into the position shown in Fig. 12, in which position it causes the control shaft 36 to rotate in a direction opposite to that indicated by the curved arrow in Fig. 1.

During approximately the first 25 degrees of rotation of the control shaft 36 in that direction, the cam 85 causes the arm 78 to lift the tone arm off the record, the finger 100 allows the spring 93 to cause the finger 89 to swing the tone arm 70 back along the arm 78 beyond the starting position of the tone arm, the cams 184 allow the springs 185 to swing the fingers 179 away from the ends of the plungers 145, whereby to permit the grippers 140 to engage with the record on the turntable, the finger 58 on the control shaft allows the lever 59 to lower the turntable, and the upper stationary cams 164 permit the arms 159 on the control shaft to connect with the arms 158 carrying the trucks 147.

Upon the completion of the above described operations, the trucks 147, together with the carriages 142 and the grippers 140 holding the record, proceed to travel back along the tracks 148 to the rack. When the trucks reach the curved portions 228 of the tracks, the guiding blocks 150 on the carriages move out of engagement with the horizontal guides 152 and the pawls 229 engage within the notches 232 in the disks 233 and cause the carriages, together with the grippers and the record held therebetween, to rotate 180 degrees. After the carriages and the grippers have been rotated, the guiding blocks 150 move into sliding engagement with the vertical guides 151, and the trucks continue downwardly along the vertically extending portions of the tracks into positions at opposite sides of the particular compartment in the rack from which the record had previously been taken. The lower stationary cams 164 then release the arms 158 from the arms 159 on the control shaft, whereby to allow the trucks 147 to come to rest, and the control shaft continues to rotate approximately 25 degrees more in the same direction. During the last part of the rotation of the control shaft, the cams 177 on the same cause the fingers 172 to press the plungers 145 inwardly and release the record, the cam roller 121 on the control shaft oscillates the lever 118 and causes the disk 110 to rotate one-sixth of a revolution (which rotation, however, does not advance the rack since the pin 111 then uppermost in the disk does not happen to be one of the alternate ones which project rearwardly from the disk into engagement with the separators 104), and the finger 58 on the control shaft causes the lever 217 to shift the collar 26 from the position shown in Fig. 12 to that shown in Fig. 11, whereupon the control shaft reverses its direction of movement and again starts to rotate in the direction indicated by the curved arrow in Fig. 1.

As the control shaft rotates a second time in the direction indicated by the arrow, the grippers 140 pick up the same record again and carry it up to the turntable, the finger 89 is swung back out of the path of the tone arm, the tone arm is swung into a position directly over the preliminary sound grooves in the record, the turntable is raised into engagement with the record, the tone arm is lowered onto the record, the arms 158 are disconnected from the arms 159 on the control shaft, the lever 213 is reset by the lever 238 under the action of the cam 85 on the control shaft, and the finger 237 causes the lever 217 to shift the collar 26 into a position wherein the control shaft is brought to rest while the circuit of the motor remains closed.

After the record has been played on the second side and the needle has reached the spiral or eccentric end of the sound groove, the collar 26 is shifted into the position shown in Fig. 12, whereby to start rotation of the control shaft 36 in the direction opposite to that indicated by the curved arrow in Fig. 1. As soon as the control shaft commences to rotate in that direction, the tone arm is raised and swung back, the record is picked up by the grippers, and the trucks, together with the carriages and the grippers, are moved back to the rack along the tracks 148. During the return movement of the trucks, the position of the carriages and the grippers holding the record is reversed with respect to the trucks by the action of the pawls 229, and, when the trucks reach positions at opposite sides of the rack, they come to rest and the grippers replace the record in the particular compartment from which it was originally taken.

After the trucks have come to rest, the control shaft continues to rotate, and, during such rotation, the roller 121 on the control shaft causes the rack to move forwardly, whereby to bring the next compartment in the rack into register with the retracted grippers. As soon as the rack has moved forward, the finger 58 on the control shaft causes the lever 217 to shift the collar 26 from the position shown in Fig. 12 to that shown in Fig. 11, thereby finishing one complete cycle of operation and commencing the next.

The phonograph will continue to operate automatically in the manner above described, playing each of the records in the rack first on one side and then on the other, in the order in which they are arranged in the rack, and, after the last record in the rack has been played on both sides, the cam 132 on the rack will cause the pawl 129 to be disengaged from the rack whereby to allow the spring 125 to return the rack into a position wherein the first compartment therein is again in register with the grippers, whereupon each of the records in the rack will automatically be played over again, first on one side and then on the other, the automatic operation continuing indefinitely until the phonograph is shut off.

During the intervals in which the records are being moved back and forth between the rack and the turntable, the needle 72 may be automatically changed by a needle-changing device of any suitable character.

I claim:

1. In a phonograph, in combination, a record magazine, a turntable, a plurality of grippers for engaging a record in the magazine and placing it upon the turntable, a reproducer, means for automatically placing the reproducer in engagement with the preliminary sound grooves on the record irrespective of the size of the record means for removing the reproducer from the record when played, means for causing the grippers to remove the record from the turntable, turn the record over and replace it upon the turntable.

2. In a phonograph, a record magazine, a turntable, means for transferring a record from said magazine to said turntable, a reproducer movable vertically toward and from said turntable, means for placing the needle of the reproducer in cooperative position over the record in a position determined by the size of the record, and means including a weight actuated lever for moving the needle of the reproducer into engagement with the preliminary grooves of the record being played irrespective of the size of the record.

3. In a phonograph, a record magazine, a turntable, means for transferring a record from said magazine to said turntable, a reproducer, means operable by said transferring means for placing said reproducer in position to engage the preliminary sound grooves in the record, and means for causing the reproducer positioning means to compensate for different sizes of records.

4. In a phonograph, a record magazine, a turntable, a plurality of adjustable grippers adapted automatically to engage records of varying sizes for transferring a record regardless of its size from the magazine to the turntable, a reproducer movable into and out of engagement with a record on said turntable, and means actuated in accordance with the position of one of said grippers to place said reproducer into position to engage the preliminary sound grooves in the record regardless of the size of the record.

5. In a phonograph, a record magazine, a turntable, means for transferring a record from the magazine to the turntable, a reproducer movable into and out of engagement with a record upon the table, a pivoted member for moving said reproducer into position to engage the preliminary sound grooves in the record, said pivoted member having a plurality of contacting portions and means projecting from said transferring means and controlled by the size of the record being transferred adapted to selectively engage one of said contacting portions in accordance with the size of the record.

6. In a phonograph, a record rack for holding a plurality of records, a turntable, a reproducer, means for transferring records from said rack to said turntable to be played upon by said reproducer, means for causing said transfer means to return the played records to the rack and means for moving said rack relatively to said transfer means upon alternate return trips of said transferring means.

7. In a phonograph, a record rack for holding a plurality of records, a turntable, a reproducer, means for transferring records from said rack to said turntable to be played upon by said reproducer, means for turning said records upon movement in one direction of said transfer means, means for causing said transfer means to return the played records to the rack and means for advancing said rack relatively to said transfer means to present a different record to said transfer means upon alternate return movements of said transfer means.

8. In a phonograph, a record rack for holding a plurality of records, a turntable, a reproducer, means for transferring records from said rack to said turntable to be played upon by said reproducer, means for turning said records upon movement in one direction of said transfer means, and means for advancing said rack relatively to said transfer means to present a different record to said transfer means, said latter means including a ratchet wheel, means for imparting successive rotative movements to said wheel and mechanism actuated by alternate movements of said ratchet wheel for intermittently advancing said record rack.

9. In a phonograph, a record magazine, a turntable and a plurality of grippers for transferring the records from said magazine to said turntable and back to said magazine, said grippers being arranged in opposed pairs, the grippers of each pair being movable toward and from each other to center records regardless of their size, and means for resiliently urging the grippers of each pair toward each other.

10. In a phonograph, a record magazine, a turntable and pivoted grippers for transferring records from said magazine to said turntable and back to said magazine, said grippers being arranged in opposed pairs, means for urging the grippers of each pair together to move a record therebetween to a predetermined position regardless of the size of the record, and means for separating said grippers to release a record held therebetween.

11. In a phonograph, a record magazine, a turntable, and means for transferring records from said magazine to said turntable and back to said magazine, said transferring means including a pair of trucks, a pair of pivoted grippers carried by each of said trucks, and resilient means for urging the grippers of each pair together to grip a record therebetween, and means for moving said trucks between positions adjacent said magazine and adjacent said turntable.

12. In a phonograph, a record magazine, a turntable, and means for transferring records from said magazine to said turntable and back to said magazine, said transferring means including a pair of trucks, a pair of pivoted grippers carried by each of said trucks, and resilient means for urging the grippers of each pair together to grip one side of a record therebetween, guide rails extending between said magazine and said turntable, and means for moving said trucks and grippers carried thereby along said guide rails to positions adjacent said magazine and said turntable.

13. In a phonograph, a record magazine, a turntable, means for transferring records from said magazine to said turntable including grippers for holding the record, a driven shaft, a connecting rod pivoted to said grippers, and a yielding connection between said shaft and said rod whereby said shaft may rotate independently of said rod.

14. In a phonograph, a record magazine, a turntable, means for transferring records from said magazine to said turntable including grippers for holding the records, a driven shaft, a connecting rod pivoted to said grippers, and a sliding connection between said rod and said shaft to accommodate for varying distances between said grippers and said shaft.

15. In a phonograph, a record magazine, a turntable, means for transferring records from said magazine to said turntable including grippers for holding the records, a driven shaft, a connecting rod pivoted to said grippers, and a yielding connection between said shaft and said rod whereby said shaft may rotate independently of said rod, said connection between said shaft and rod also permitting sliding movement therebetween to accommodate for varying distances between said grippers and said shaft.

16. In a phonograph, a record magazine, a turntable, means for transferring records from said magazine to said turntable and back again, said means including gripper mechanism for holding a record, guide rails extending between said magazine and said turntable, means for moving said grippers along said rails from said magazine to said turntable and back, and means supported by said rails for reversing said gripper mechanism to turn a record carried thereby.

17. In a phonograph, a record magazine, a turntable, means for transferring records from said magazine to said turntable and back again, said means including gripper mechanism for holding a record, guide rails extending between said magazine and said turntable, means for moving said grippers along said rails from said magazine to said turntable and back, and means supported by said rails for reversing said gripper mechanism to turn a record carried thereby when said gripper mechanism moves in one direction over said rails and inoperative when said gripper mechanism passes in the other direction over said rails.

18. In a phonograph, a record magazine, a turntable, means for transferring records from said magazine to said turntable and back again, said means including gripper mechanism for a record, guide rails extending between said magazine and said turntable, means for moving said grippers along said rails from said magazine to said turntable and back, and means pivoted to said rails and projecting into the path of said gripper mechanism operative to reverse said mechanism to turn the record held thereby.

19. In a phonograph, in combination, a record rack, a turntable, a reproducer, adjustable means for automatically transferring a record from the rack to the turntable, means for automatically placing the reproducer in engagement with the preliminary sound grooves in the record, whereby to play the record, means for automatically causing the record-transferring means to conform to either large or small records, and means for automatically causing the reproducer-placing means to compensate for either large or small records.

20. In a phonograph, a record magazine, a turntable, means for transferring a record from said magazine to said turntable, a reproducer movable vertically toward and from said turntable, means for placing the needle of the reproducer in cooperative position over the record in a position determined by the size of a record, and means including a weight and a lever for moving the needle of the reproducer into engagement with the preliminary grooves irrespective of the variation in position thereof on records of the same size.

21. In a phonograph, a record magazine, a turntable, means for transferring a record from said magazine to said turntable, a reproducer movable vertically toward and from said turntable, means for placing the needle of the reproducer in cooperative position over the record in a position determined by the size of a record, means including a pivoted lever for lowering the needle upon the record, and lever means including a weight for moving the lowered needle into the preliminary sound grooves of the record.

22. In a phonograph, a record magazine, a turntable, means for positively engaging and transferring a record from said magazine to said turntable, a reproducer, means operable by said transferring means for placing said reproducer in position to engage the preliminary sound grooves in the record, and means for moving said reproducer into engagement with the preliminary sound grooves.

JOHN L. VAUGHN.